Aug. 28, 1973 E. A. WEIMER, JR Re. 27,743
ELECTRICAL CONNECTION FOR TERMINATING ALUMINUM FOIL
Original Filed April 22, 1964
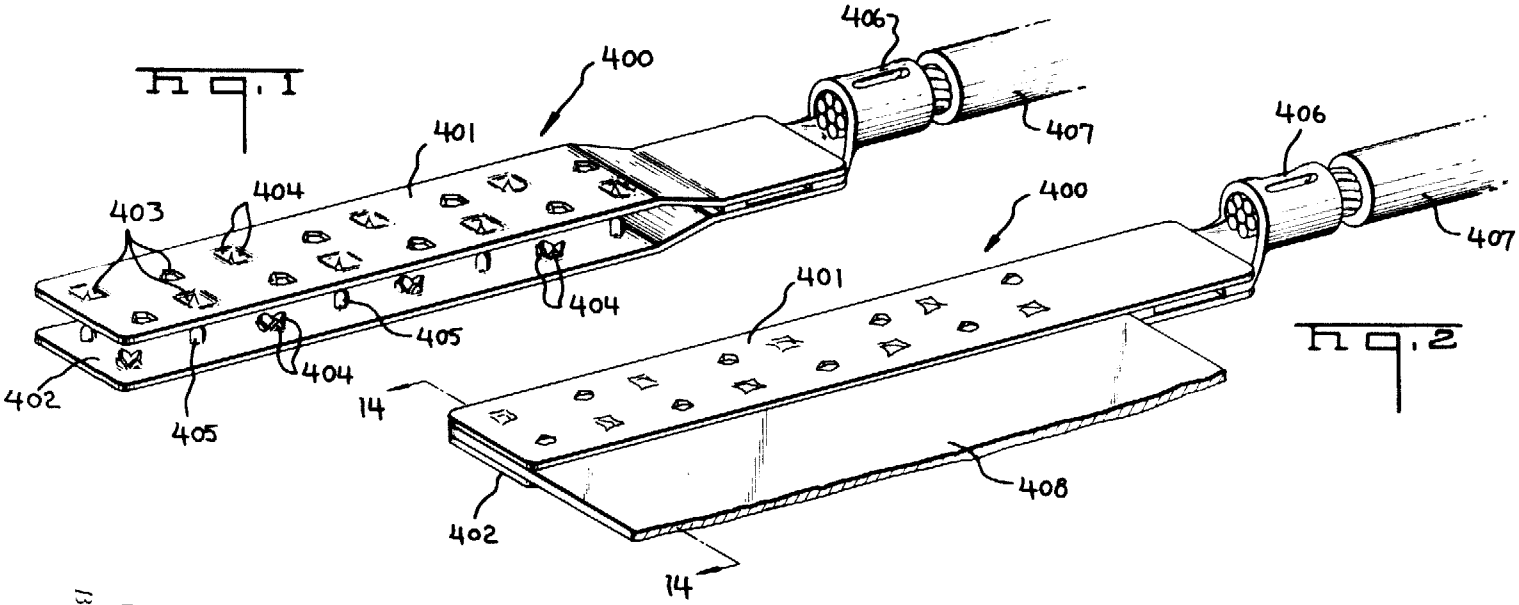
FIG. 1
FIG. 2
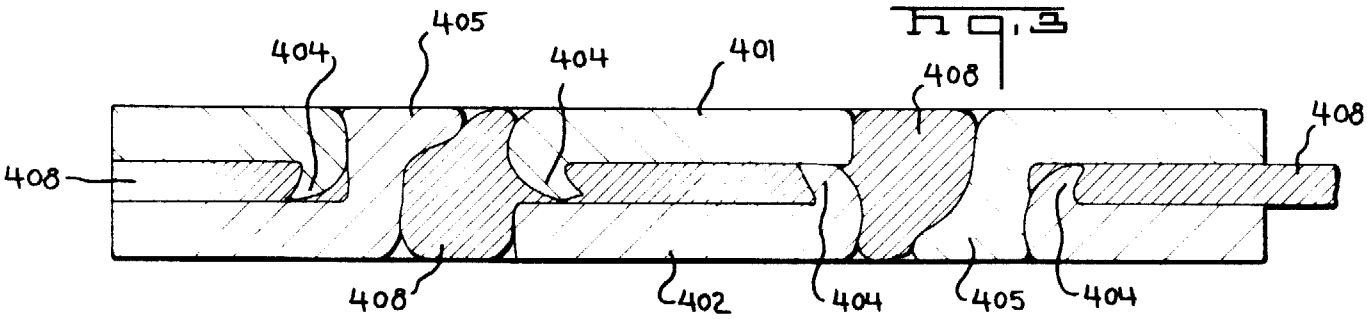
FIG. 3
INVENTOR.
EDGAR ARTHUR WEIMER, JR.
BY Curtis, Morris & Safford United States Patent Office Re. 27,743
Reissued Aug. 28, 1973

27,743

ELECTRICAL CONNECTION FOR TERMINATING ALUMINUM FOIL

Edgar Arthur Weimer, Jr., Harrisburg, Pa., assignor to AMP Domestic Inc.

Original No. 3,247,316, dated Apr. 19, 1966, Ser. No. 361,853, Apr. 22, 1964, which is a continuation-in-part of abandoned application 857,158, Dec. 3, 1959, and application Ser. No. 141,166, Sept. 27, 1961, now Patent No. 3,138,658. Application for reissue Nov. 28, 1969, Ser. No. 876,185, which is a continuation of abandoned applications Ser. No. 646,741, Apr. 27, 1967, and Ser. No. 726,621, Apr. 29, 1968

Int. Cl. H01r *5/00*

U.S. Cl. 174—94 R 6 Claims

Matter enclosed in heavy brackets [ ] appears in the original patent but forms no part of this reissue specification; matter printed in italcs indicates the additions made by reissue.

*ABSTRACT OF THE DISCLOSURE*

*An improved electrical connector provided by a pair coextensive plates having opposed apertures therein and lances on the plates projecting toward the apertures, so that when the plates are pressed together by opposing anvils some of the lances pass through the sheet and opposing apertures to be compressed by an anvil while other lances become embedded therein.*

*This application for reissue of U.S. Patent No. 3,247,-316 is a continuation of application Serial No. 646,741 filed April 27, 1967, now abandoned, and of application Serial No. 726,621, filed April 29, 1968, now abandoned.*

This application constitutes a continuation-in-part of my previous applications, Serial No. 857,158, filed December 3, 1959, now abandoned, and Serial No. 141,-166, filed September 27, 1961, now Patent No. 3,138,658.

The extensive use of conductive foil or very thin sheet metal members (e.g., aluminum) as an electrical conductor for electronic and miniature components is complicated by the fact that it is difficult to join the foil to other electrical conductors. Because of the fragile nature of the foil, securing the foil to a wire or component tends to either tear the foil or to make an imperfect connection. It is an object of this invention to provide an electrical connector capable of being secured to conductive foil, or the like, which provides an electrical connection is easily applied and has high tensile strength and excellent properties of electrical conductivity.

It is also an object of this invention to provide an electrical connecting device adapted to be secured to aluminum foil by wrapping it around the foil and pressing it into the foil.

It is also an object of this invention to provide an electrical connecting device adapted to be secured to aluminum foil by wrapping or folding it over the foil and clamping it thereto so that tangs on one area of the device pierce the foil.

It is a further object of the present invention to provide a terminating means for sheet metal or metal foil, such as, for example, copper, aluminum, alloys thereof, or the like, which comprises a terminal having on one side lance means having a plurality of points and on the other side in opposition to the lance means, a one-point tab or lance member.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

In the drawings:

FIGURE 1 is a perspective view of the present invention;

FIGURE 2 is a perspective view similar to FIGURE 12 showing the connector applied to a sheet of metal; and FIGURE 3 is an enlarged cross-sectional view taken along lines 14—14 of FIGURE 2.

Turning now to FIGURES 1–3, there is shown an embodiment of the present invention. In this embodiment, connector 400 comprises two opposed legs or plates 401 and 402 connected together at one end. Each leg includes rows of perforations 403. Every other perforation in each row has a plurality of sharp lances or tanks 404 formed therearound which are substantially of V-shaped configuration and extend outwardly from the leg in a direction substantially parallel to the axis of the perforation. Each of the remaining perforations in each row has a single sharp lance or tang 405 of similar configuration as those of lances 404 extending outwardly from the leg in a direction substantially parallel to the axis of the perforation.

As can be discerned from FIGURE 1, the lances on one leg extend toward the lances on the other leg and the perforations containing lances 404 are oppositely disposed with respect to the perforations containing lances 405. While it is desirable that the apertures in each leg be oppositely disposed, in some cases they will be slightly out of alignment; but, upon application to a conductive member, they will come into alignment. When forming lances 405, it is desirable, where applicable, that they be diagonal with respect to the opposing perforations containing lances 404. While only two rows of lanced perforations have been shown in each leg of the connector, it is obvious that one or more rows may be provided in each leg, a single perforation of either kind in one leg may be diametrically disposed with respect to the other kind of perforation in the other leg, or the perforations in each leg may be staggered with respect to each other so long as the perforations containing lances 404 in one leg are opposite the other perforations containing lances 405 in the other leg. Other arrangements can obviously be visualized; however, description thereof would be superfluous.

As shown in FIGURES 1 and 2, one end of legs 401 and 402 are connected together while the other ends are free. A ferrule member 406 extends outwardly from the connected ends and is affixed to the wire section of an electrical conductor means 407 as, for example, by crimping, welding, soldering, etc. Of course, an electrical conductor means may be secured to the connector in the manner shown in FIGURES 8 or 9 in the aforementioned patent or in any other suitable manner. Additionally, connector 400 may take the forms illustrated in FIGURES 2, 4, 8 and 9 in the aforementioned patent.

The connector may be made from any desirable material, such as, copper, brass, steel, bronze, etc., and the type of metal or alloy thereof will depend primarily on its use and the purposes of conductivity. Plating the connector may also be desirable. This embodiment may be affixed to a conductive member 408 which not only may be metallic foil but also sheet metal up to any workable thickness, and the size and hardness of the connector will be proportional to that of the material to which it is to be attached. It should be pointed out that the foil or sheet metal may be coated with insulating material which need not be removed upon the connector being applied to the conductive member. This is also true with respect to the other embodiments.

In assembly, conductive member 408 is placed between legs 401 and 402, pressure is applied to the outer surface of each leg as, for example, by means of opposing anvils, whereupon the perforations containing lances 404 provide a punch relief area so that opposing lances 405 easily punch through the conductive member. Upon the legs being pressed into tight engagement with the conductive member, lances 405 engage one of the anvils and become flattened in rivet-like manner, while lances 404 pierce, scrape and become embedded into or impaled upon the conductive member because the inner surface of the leg adjacent lances 405 acts as an anvil to cause these lances to bend back toward their respective leg. FIGURE 3 illustrates the foregoing which shows the disposition of lances 404 and 405 and thereby provides a riveted and, therefore, interlocked connection or termination.

With respect to the embodiment of FIGURES 1–3, the aggregate number of lances provides a strong connection between the connector and conductive member. During the terminating process, the lances pierce and scrape oxides from the area of engagement with the conductive member (and insulation coating if such is thereon) to result in an excellent mechanical and electrical connection.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

What is claimed is:

1. An electrical connection comprising leg members having opposed surfaces, each leg member having at least one aperture, the apertures in each leg being in opposition, each aperture having lance means thereat and extending toward each other, said leg members being pressed into engagement with a sheet of conductive material with the lance means of one aperture piercing said sheet and extending through the other aperture, the lance means of the other aperture scraping and piercing the sheet and being bent back toward the respective leg member thereof upon engagement with the inner surface of the opposing leg member, the end of the lance means extending through the other aperture being blunted to rivet the leg members in mechanical and electrical engagement with said sheet of conductive material.

2. An electrical connection between a connector and a sheet of conductive means comprising leg means having opposing surfaces, each of said surfaces having a plurality of apertures, the apertures in one surface being disposed substantially opposite to the apertures in the other surface, lance means located adjacent each aperture and extending toward each other, said leg means being pressed into engagement with said sheet of conductive means with some of the lance means of each of said leg means piercing said sheet of conductive means and extending through the apertures in opposition thereto while the lance means of these opposition apertures scrape and pierce the sheet of conductive means and are bent back toward the respective leg means thereof upon engagement with the inner surface of the opposing leg means, the ends of the lance means extending through the opposition apertures being blunted to rivet the leg means in mechanical and electrical engagement with said sheet of conductive means.

3. As an article of manufacture, an electrical connector for making electrical connection with a sheet of conductive means comprising *a pair of* plate means *secured to a common base and* each provided with at least one aperture, the aperture in one plate means being oppositely disposed with respect to the aperture in the other plate means, lance means projecting from each plate means toward [each] *the* other *plate means,* said lance means being disposed adjacent the periphery of each of the apertures, said lance means of one plate means being *only one lance* [a single lance means] and being adapted to penetrate said sheet of conductive means, extend through the opposing aperture and be blunted to rivet said plate means together while the lance means of the other plate means include a plurality of [lance means] *lances* which are adapted to be bent away from the aperture thereof to grasp the sheet of conductive means in electrically conductive relationship between the plate means.

4. As an article of manufacture, an electrical connector for making electrical connection with a sheet of conductive means comprising *a pair of* plate means *secured to a common base and* each provided with a plurality of apertures, the apertures in one plate means being oppositely disposed with respect to the apertures in the other plate means, lance means projecting from each plate means toward [each] *the* other *plate means,* said lance means being disposed adjacent the periphery of each of said apertures, some of the lance means on the plate means being a single lance [means] and being adapted to penetrate said sheet of conductive means, extend through the opposing apertures and be blunted to rivet said plate means together while the other complementary [lance means] *lances* include a plurality of lance means which are adapted to be bent away from the apertures thereof to grasp said sheet of conductive means in electrically conductive relationship between the opposing plate means.

5. An electrical connector according to claim 3 wherein said [single lance means] *one lance* is diagonally disposed with respect to the opposing aperture having a substantially rectangular configuration.

*6.* *An electrical connection comprising leg members having opposed surfaces, each leg member having apertures, the apertures in each leg member being in opposition, each aperture having lance means adjacent said aperture and said lance means on one leg member extending toward corresponding lance means on said other leg member, said leg members being pressed into engagement with a sheet of conductive material with the lance means at the apertures of one leg member piercing said sheet and extending through respective apertures of the other leg member and bent inwardly, the lance means at the apertures of the other leg member piercing the sheet and bent inwardly toward the one leg member during the pressing of the leg members together, the inwardly bent lance means thereby riveting the leg members in mechanical and electrical engagement with said sheet of conductive material.*

References Cited

The following references, cited by the Examiner, are of record in the patented file of this patent or the original patent.

(Other references on following page)

UNITED STATES PATENTS

| | | | |
|---|---|---|---|
| 3,242,256 | 3/1966 | Jugle | 174—84 |
| 3,278,880 | 10/1966 | Lewis et al. | 174—94 X |
| 2,020,408 | 11/1935 | Fruth | 317—260 X |
| 2,623,101 | 12/1952 | Kurland et al. | 174—52 X |
| 3,064,072 | 11/1962 | Graff et al. | 174—87 |
| 3,138,658 | 6/1964 | Weimer | 174—94 |

FOREIGN PATENTS 578,487 7/1946 Great Britain.

BERNARD A. GILHEANY, Primary Examiner

U.S. Cl. X.R.

29—628; 174—84 R; 339—95 R, 276 T